UNITED STATES PATENT OFFICE.

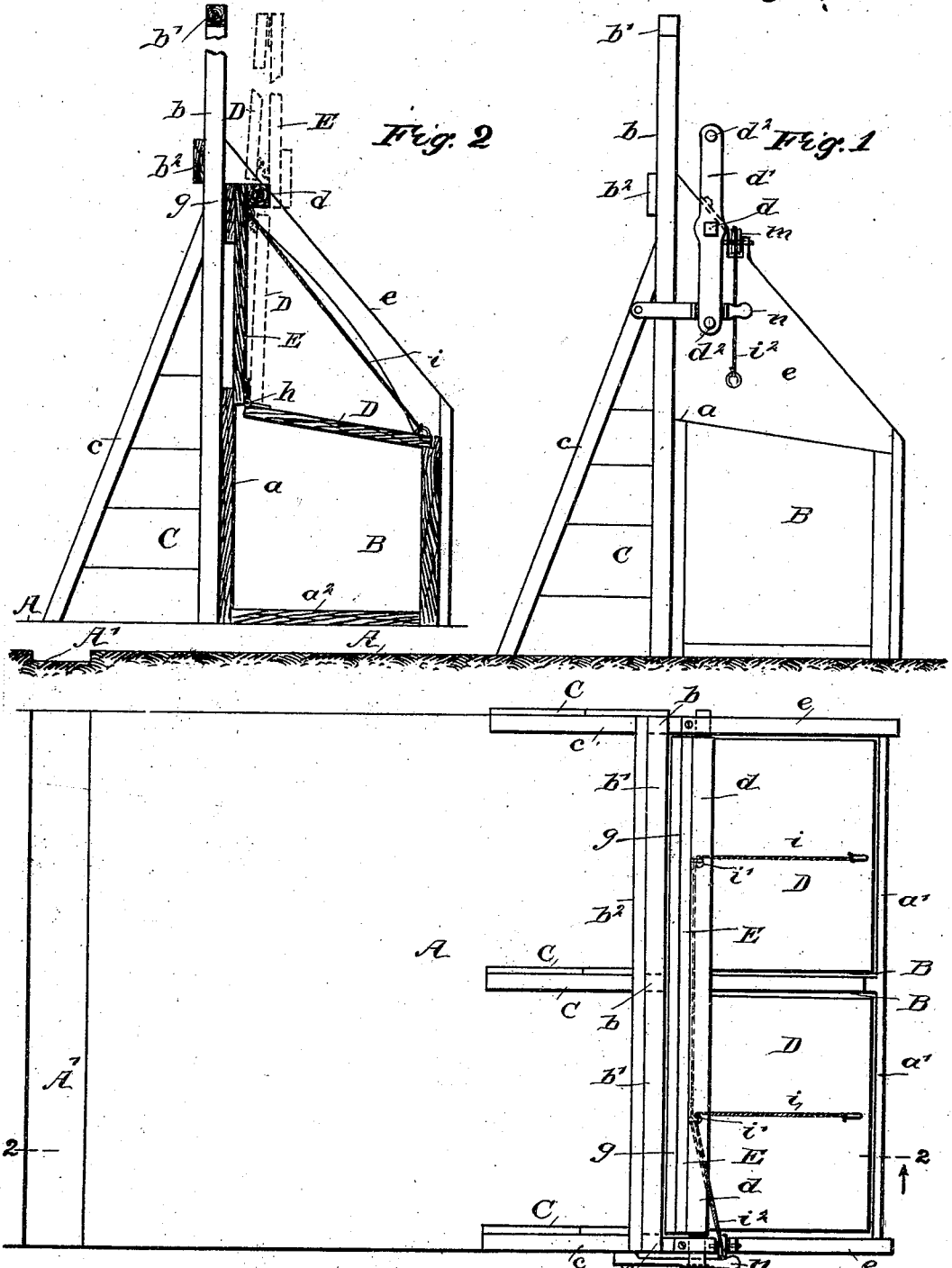

JAKOB AEBERLY, OF ST. PAUL, MINNESOTA.

CATTLE-STALL.

SPECIFICATION forming part of Letters Patent No. 502,599, dated August 1, 1893.

Application filed February 20, 1893. Serial No. 463,019. (No model.)

*To all whom it may concern:*

Be it known that I, JAKOB AEBERLY, of St. Paul, in the county of Ramsey and State of Minnesota, have invented new and useful Improvements in Cattle-Stalls, of which the following is a full, clear, and exact description.

This invention relates to improvements in stalls for milk cattle that are housed for protection, and has for its object, to provide a stall, which will enhance the comfort and conduce to the regular feeding of the animal stalled therein, inducing the beast by enforced periodic feeding to rest in recumbent position when not taking food, and thus by regularity of habit, prevent a fouling of the stall and a consequent deposit of excrement upon the udder, thereby obviating the danger of rendering the milk impure when drawn therefrom.

To these ends, my invention consists in the construction and combination of parts, as is hereinafter described and claimed.

Reference is to be had to the accompanying drawings forming a part of this specification, in which similar letters of reference indicate corresponding parts in all the figures.

Figure 1 is a side view of the improved stall. Fig. 2 is a sectional side view of the improvement on the line 2—2 in Fig. 3; and Fig. 3 is a plan view of two adjacent stalls embodying the features of the invention.

The stalls are preferably constructed in pairs, but the number may be increased, and consist of a flooring A, formed of wooden planks, or any other suitable material, so as to provide a level platform for the animal to occupy while stalled, there being a transverse gutter A', located at the rear of the platform, for the reception and transfer of excreted matter and washings from the platform, to a pit or other place of deposit for such material.

Two or more feed cribs are provided, of a like form, each consisting of a rectangular box B, wherein hay, corn fodder or other food supply for the cattle is deposited, the height of the receptacles at their vertical side walls nearest to the front transverse edge of the platform A, being such as will permit the cattle that are haltered thereto, to feed over the free top edges of said walls, from the contents of the crib. There are three stanchions $b$, of the same dimensions erected from the platform $a$, one at each outer side wall of a feed crib B, and one at the center or division wall of said crib. The stanchions $b$, are joined at their upper ends by the transverse beam $b'$, and below said beam by the scantling strip $b^2$. From each stanchion $b$, a short vertical partition wall C, is rearwardly extended, resting at the base upon the platform, and by preference sloped on the rear edge outwardly and downwardly from a point at a proper height on the stanchions, said partitions being each strengthened by inclined beams $c$, which form the rear edge of the partition, as indicated in Figs. 1 and 2.

The essential features of the invention, consist of the adjustable covers D, for the bins, and the pendent gates E, on which the covers are hinged by one end, together with effective means for the manipulation of said parts, so as to open and close the cribs B at their tops and also the spaces above the walls $a$ of the cribs, to thereby control access to the food in said cribs, and restrict the animals in the stalls from eating, only at proper intervals of time.

The preferred means for supporting the parts D, E, comprise a transverse shaft $d$, which is journaled in the outer side walls $e$ of the cribs B, at a proper height for efficient service, and upon said shaft at one projecting end, a transverse handle bar $d'$, is affixed near its longitudinal center, thus affording two crank arms, from the ends of which grip pins $d^2$, or handles of greater length are outwardly projected, to facilitate the rotatable movement of the shaft.

The duplicate gates E, are secured firmly upon the shaft $d$, and preferably said attachment is re-inforced by transverse battens $g$, of like form which are secured upon the front surface of each gate at its upper edge, as shown in Fig. 2. Upon the lower edge of each gate E, the cover D, is hinged as at $h$, which will permit the cover to be folded upwardly against the gate upon which it is secured. The gates E, and hinged covers D, are of such relative dimensions, that when in lowered adjustment, the gates will fill the spaces above the crib walls $a$, a proper height, to prevent the stalled animals from passing their heads through the openings above these walls to insert them within the cribs B, the covers being adapted to protect the open tops of the cribs as lids, to prevent the contents from being abstracted improperly, when said parts D, are imposed upon the upper edges of the walls $a'$, of the cribs which walls are parallel with the walls $a$, and with the three side walls and a suitable bottom wall $a^2$, complete the cribs.

A chain $i$, is provided for each cover D, or, if preferred, a rope may be used, one end of which is secured to the cover at its edge which is above the wall $a'$, of each crib B, and thence extended upwardly and toward the gate E thereof, where the rope passes through staples $i'$, and from the staples, the two ropes which separately control the covers D, are extended toward the side whereon the crank handle bar $d'$, is located, and are together joined to a single rope $i^2$, which rests upon a grooved pulley $m$, pivotally supported on the upper part of the side wall $e$, of the crib, so that draft upon the rope $i^2$, will simultaneously elevate the covers D, into a vertical position close to the gates E. The crank arms of the handle bar $d'$, may now be rotatably moved, so as to rock the gates E, and the folded covers D, into a vertical position, as shown by dotted lines in Fig. 2, which adjustment of parts will open a clear entrance from each stall into the crib opposite it, and thus permit the stalled cows to feed while such an adjustment of the covers and gates is maintained, it being apparent that by a proper manipulation, the gates and covers may be thrown into a closed condition.

When the gates E and covers D, are to be secured from displacement either in an open or closed condition, this may be readily effected, if the pivoted latch-piece $n$, is swung across the path of the handle bar $d'$, so as to embrace its side edges near the end which may be lowermost, and thus prevent a rotatable movement of said handle bar until the latch-piece is removed therefrom, said piece $n$, having proper projections on its side to adapt it to embrace the bar, as stated.

When cows are stalled, and they have had a sufficient amount of food, they will, if not eating, assume a recumbent position and thus better digest the food of which they have partaken.

When the milk cattle are stalled in mangers of the improved style, the platforms A, may be renovated at the time they have consumed a proper quantity of food, and then the gates E, and covers D, are closed, which will cause the animals to step rearwardly a short distance, care being taken to avoid any injurious contact with their heads. The beasts will now lie down and thus occupy the clean platforms, thereby avoiding any contact of their udders with filth, that by its odor or possible actual contact with the fresh milk, subsequently extracted therefrom, will contaminate the latter, and greatly lessen its value as an article of food.

Having thus described my invention, I claim as new and desire to secure by Letters Patent—

1. A cattle stall, having a feed crib protected by a pendent gate, a cover hinged to the lower edge of said gate, a rotatable shaft attached to the gate, and a flexible device on the cover which by manipulation, will adjust said cover toward or from the feed crib, substantially as described.

2. A cattle stall and feed crib therefor, comprising a stall having a platform or base, a feed crib at the head of the stall, a pendent gate between the top of the feed crib and the stall, a crib cover hinged to the lower edge of the gate, and devices adapted by manipulation to elevate the gate and fold the cover upon said gate, substantially as described.

3. A feed crib for a cattle stall, and attachments for said crib, comprising a rectangular crib at the head of a stall, a transverse shaft journaled in the upper part of the side walls of the crib, a gate attached by one edge to the shaft and pendent therefrom, a crib cover hinged by one edge to the lower edge of the gate, a flexible device for the cover to raise or lower it, a handle bar on the end of the shaft, and a latch-piece therefor, substantially as described.

JAKOB AEBERLY.

Witnesses:
MARGARET SCHEMBEI,
PETER SCHLETTI.